United States Patent Office 3,232,822
Patented Feb. 1, 1966

3,232,822
BONDING OF REFRACTORY MATERIALS BY MEANS OF CERIUM OXIDE-CERIUM SULFIDE MIXTURES AND PRODUCT
Harry D. Bush, Cleveland, Ohio, assignor to Union Carbide Corporation, a corporation of New York
No Drawing. Filed Apr. 19, 1962, Ser. No. 188,878
17 Claims. (Cl. 161—182)

The present invention relates generally to the bonding of refractory materials and, more particularly, to a process for bonding refractory materials and the bonded article produced thereby.

Heretofore, it has been necessary to use mechanical means to bond or join many refractory materials. However, although joints formed by mechanical means may have sufficient mechanical strength, they usually have a relatively high electrical resistance and, therefore, are not suitable for many applications, such as thermoelectric devices. As a result, specific geometric designs which are important in certain thermoelectric devices must often be fabricated in one piece by complex machining, which is usually economically unfeasible because of the resultant waste in time, labor, and material.

It is, therefore, the main object of the present invention to provide a process for bonding refractory materials whereby a strong joint with a relatively low electrical resistance is produced.

It is another object of the invention to provide such a process whereby a joint is produced which is at least as strong as the bonded refractory materials and has an electrical resistance of the same order of magnitude as that of the bonded materials.

It is a further object to provide economically feasible process for bonding refractory materials.

A still further object of the invention is to provide a refractory joint formed by bonding together at least two abutting refractory surfaces.

Other aims and advantages of the invention will be apparent from the following description and appended claims.

In accordance with the present invention, there is provided a process for bonding refractory materials comprising applying a layer of a finely divided mixture of cerium dioxide ($CeO_2$) and at least one sulfide selected from the group consisting of cerium trisulfide ($Ce_2S_3$) and cerium tetrasulfide ($Ce_3S_4$) to at least one of the refractory materials to be bonded, pressing the refractory materials into tight engagement with the mixture therebetween, and increasing the temperature of the mixture and the refractory surfaces in contact therewith to between about 1650° C. and the melting point of the refractory materials and maintaining the mixture and the refractory surfaces at that temperature until the desired degree of bonding is effected. The article produced by this process comprises at least two refractory materials bonded together by a thin layer of a mixture of the refractory materials, $CeO_2$, and at least one sulfide selected from the group consisting of $Ce_3S_4$ and $Ce_2S_3$, at least a portion of the mixture being dispersed within the bonded surfaces of the refractory materials.

The inventive process may be used to bond the same refractory materials or two or more different refractory materials. The process is especially useful in bonding refractory sulfides, such as the sulfides of cerium, uranium, and samarium. However, the process is equally effective in bonding other refractory materials, such as graphite and other carbonaceous materials, the joints formed by the present invention are usually as strong or stronger mechanically than the bonded materials, and the electrical resistance of the joint is usually of the same order of magnitude as that of the bonded materials.

The material which effects the bond in the present process is the mixture of cerium oxide and cerium sulfide. This mixture should contain between about 5 and about 70 percent by weight $CeO_2$, and between about 95 and about 30 percent by weight $Ce_2S_3$ and/or $Ce_3S_4$, and the preferred mixture contains about 50% by weight $CeO_2$ and about 50% by weight $CeS_3$ and/or $CeS_4$. The mixture should be in a finely divided form. In order to achieve a uniform layer of the oxide-sulfide mixture between the refractory materials to be joined, it is preferred to apply the mixture in the form of a slurry or paste made by adding cellulose nitrate in an appropriate solvent to the dry mixture. The cellulose nitrate may be dissolved in any suitable solvent, such as acetone, methyl alcohol, or ether in alcohol. The solvent evaporates off fast at room temperature, leaving a paste of $CeO_2$ and $Ce_2S_3$ and/or $Ce_3S_4$ held in a matrix of cellulose nitrate. The cellulose nitrate boils off during the subsequent heating step. Alternatively, the mixture may be applied in the form of a dry powder or any other suitable form. The thickness of the layer of oxide-sulfide mixture applied to the surface of the refractory material is not narrowly critical, but it is preferred to use as thin a layer as will produce an effective bond. A layer thickness of about 0.01 inch has been found to be sufficient for bonding most refractory materials. When the mixture is applied in the form of a paste or slurry, it is usually desirable to allow the paste or slurry to dry for a short period (e.g., air dried for 14 to 30 minutes) before the heating step.

The refractory surfaces to be bonded should be relatively smooth and parallel, and the bonding mixture may be applied to one or all of the surfaces to be joined. After the bonding mixture has been applied, the refractory surfaces should be pressed together with the finely divided mixture therebetween and subjected to the heating step. The magnitude of the pressure applied to the refractory materials to press them together is not critical to the operability of the present process; in fact, excellent joints have been produced by simply placing one refractory material on top of the other (with the oxide-sulfide mixture between the two) during the heating step, i.e., using only the pressure due to gravity. The heating step must increase the temperature of the bonding mixture and the refractory surfaces in contact therewith to between about 1650° C. and the melting point of the refractory materials being joined, preferably between 1650 and 1850° C. When two or more different refractory materials are being bonded, the bonding temperature must be below the melting point of the refractory material with the lowest melting point. The cerium oxide-cerium sulfide mixture and the refractory surfaces in contact therewith are maintained at the bonding temparture until the desired degree of bonding is effected. In the case of most refractory materials, a heating period of about 5 to 15 minutes is sufficient to achieve a good bond. The heating step may be carried out in an inert atmosphere, such as argon.

While it is not intended to limit the present invention to any particular theory, it is believed that when refractory sulfides are bonded by the inventive process, a portion of the refractory sulfide material from the surfaces being bonded is dissolved in the original oxide-sulfide mixture, thereby forming a new mixture containing the original oxide and sulfide plus the refractory sulfides being joined. This would seem to follow from the fact that the combination of $CeO_2$ and $Ce_3S_4$ forms $CeOS$, which forms a eutectic with the rare earth monosulfide at approximately 1650° C. The final mixture in the hardened joint may be a solid solution of the various materials, a matrix of individual crystals of those materials, or in some other form. At least a portion of the final mixture formed by the heating step is dispersed within the abutting surfaces of the bonded refractory materials. When graphite and other carbonaceous materials are bonded by the inventive processes, it is believed that the original oxide-sulfide mixture becomes dispersed within the carbonaceous surface with little or no dissolving of the carbonaceous material therein.

In an example of the inventive process, a mixture of finely divided (particle size of about 5 microns or less) $CeO_2$ and $Ce_3S_4$ in equal parts by weight was prepared and mixed with cellulose nitrate in a solvent to form a paste. The paste was then applied to the refractory surfaces to be joined in a smooth layer about 0.01 inch and allowed to air dry for about 15 to 30 minutes. The coated surfaces were then pressed together by hand and placed in a furnace wtih one refractory material on top of the other. The furnace was evacuated and filled with argon gas. The temperature of the furnace was slowly raised to 1650° C. and maintained at that level for 5 to 15 minutes. The bonded products were then cooled and tested for mechanical strength and electrical resistance. In each case, the joint was at least as strong as the material joined, and the electrical resistance was of the same order of magnitude as the materials joined. The materials bonded in the aforedescribed example were:

| | |
|---|---|
| CeS to CeS | US to SmS |
| US to US | graphite to graphite |
| SmS to SmS | graphite to CeS |
| CeS to US | graphite to US |
| CeS to SmS | graphite to SmS |

In another example of the inventive process, finely divided $CeO_2$ and $Ce_3S_4$ were mixed together in various proportions and formed into pastes in the same manner described above. Each paste was applied to the surfaces of CeS samples in smooth layers about 0.01 inch thick and allowed to air dry for about 15 to 30 minutes. The coated surfaces were then bonded together in the manner described in the example above. The various mixtures employed and the quality of the bonds produced thereby are shown in the following table.

| Wt. percent $CeO_2$ | Wt. percent $Ce_3S_4$ | Mol percent $CeO_2$ | Mol percent $Ce_3S_4$ | Bond |
|---|---|---|---|---|
| 0 | 100 | 0 | 100 | Poor. |
| 5 | 95 | 14 | 86 | Fair. |
| 15 | 85 | 36 | 64 | Fair. |
| 25 | 75 | 51 | 49 | Good. |
| 50 | 50 | 76 | 24 | Good. |
| 70 | 30 | 88 | 12 | Fair. |
| 75 | 25 | 90 | 10 | Poor. |
| 85 | 15 | 95 | 5 | Poor. |
| 100 | 0 | 100 | 0 | Poor. |

The bonds classified as "good" were at least as strong as the materials bonded, i.e., attempts to break the bonded article apart in the region of the joint resulted in breaks in the material rather than at the bond interface. The bonds classified as "fair" were slightly less strong than the materials bonded together, and attempts to break the bonded article resulted in a fracture along the bond interface. These bonds would be expected to be completely satisfactory in many applications. The bonds classified as "poor" were considerably weaker than the good and fair bonds and broke apart quite easily. The bonding in these cases appeared to be provided by islands or agglomerates and, therefore, was rather spotty.

As can be seen from the table, the mixtures containing about equal amounts of $CeO_2$ and $Ce_3S_4$ either in percent by weight or in mol percent produced the best bonds. Accordingly, these mixtures are deemed preferable.

The bonded products formed by the inventive process have numerous applications in thermoelectric devices. For example, the materials are useful as high-temperature thermocouple junctions.

While various specific forms of the present invention have been illustrated and described herein, it is not intended to limit the invention to any of the details herein shown, but only as set forth in the appended claims.

What is claimed is:

1. An article comprising at least two refractory materials bonded together by a thin layer of a mixture of said refractory materials, $CeO_2$, and at least one sulfide selected from the group consisting of $Ce_3S_4$ and $Ce_2S_3$, at least a portion of said mixture being dispersed within the bonded surfaces of said refractory materials.

2. An article comprising at least two refractory materials bonded together by the products formed by heating a thin layer of a mixture of $CeO_2$ and at least one sulfide selected from the group consisting of $Ce_3S_4$ and $Ce_2S_3$ in contact with the surfaces of said refractory materials to be bonded to at least 1650° C. at least a portion of said products being dispersed within the bonded surfaces of said refractory materials.

3. The article of claim 2 wherein said mixture contains between about 5 and about 70 percent by weight $CeO_2$ and between about 95 and about 30 percent by weight of at least one sulfide selected from the group consisting of $Ce_3S_4$ and $Ce_3S_3$.

4. The article of claim 2 wherein said mixture contains about 50 precent by weight $CeA_2$ and about 50 percent by weight of at least one sulfide selected from the group uranium sulfide, consisting of $Ce_3S_4$ and $Ce_2S_3$.

5. The article of claim 2 wherein said refractory materials are selected from the group consisting of cerium sulfide, uranium sulfide, samarium sulfide, and graphite.

6. A refractory joint comprising at least two abutting surfaces of refractory material bonded together by a thin layer of a mixture of said refractory materials, $CeO_2$, and at least one sulfide selected from the group consisting of $Ce_3S_4$ and $Ce_2S_3$, at least a portion of said mixture being dispersed within said abutting surfaces, said joint being at least as strong as the refractory materials being bonded.

7. A process for bonding refractory materials selected from the group consisting of cerium sulfide, uranium sulfide, samarium sulfide, and graphite comprising: applying a layer of a finely divided mixture containing about 50 percent by weight of $CeO_2$ and about 50 percent by weight of at least one sulfide selected from the group consisting of $Ce_3S_4$ and $Ce_2S_3$ to at least one of the refractory materials to be bonded; pressing said refractory materials into tight engagement with said mixture therebetween; and increasing the temperature of said mixture and the refractory surfaces in contact therewith to between about 1650° C. and the melting point of said refractory materials and maintaining said mixture and said surfaces at said temperature until the desired degree of bonding is effected, said heating step being carried out in an inert atmosphere.

8. A process for bonding refractory materials comprising: applying a layer of a finely divided mixture of $CeO_2$ and at least one sulfide selected from the group consisting of $Ce_3S_4$ and $Ce_2S_3$ to at least one of the refractory materials to be bonded; pressing said refractory materials into tight engagement with said mixture therebetween; and increasing the temperature of said mixture and the refractory surfaces in contact therewith to between about 1650° C. and the melting point of said refractory materials and maintaining said mixture and said surfaces at said temperature until the desired degree of bonding is effected.

9. The process of claim 8 wherein said mixture contains between about 5 and about 70 percent by weight $CeO_2$ and between about 95 and about 30 percent by weight of at least one sulfide selected from the group consisting of $Ce_3S_4$ and $Ce_2S_3$.

10. The process of claim 2 wherein said mixture contains about 50 percent by weight $CeO_2$ and about 50 percent by weight of at least one sulfide selected from the group consisting of $Ce_3S_4$ and $Ce_2S_3$.

11. The process of claim 8 wherein the heating step is carried out in an inert atmosphere.

12. The process of claim 8 wherein said mixture is in the form of a paste when it is applied to said refractory materials.

13. The process of claim 8 wherein said mixture and the refractory surfaces in contact therewith are maintained at said temperature between about 1650° and the melting point of said refractory materials for at least 5 minutes.

14. The process of claim 8 wherein the temperature of said mixture and the refractory surfaces in contact therewith is increased to between 160 and 1850° C.

15. The process of claim 8 wherein the thickness of said layer of said mixture applied to said refractory materials is about 0.01 inch.

16. The process of claim 8 wherein the maximum particle size in said finely divided mixture is about 5 microns.

17. The process of claim 8 wherein said refractory materials are selected from the group consisting of cerium sulfide, uranium sulfide, samarium sulfide, and graphite.

References Cited by the Examiner

UNITED STATES PATENTS

| | | | |
|---|---|---|---|
| 2,105,166 | 1/1938 | Schwarzkopf | 117—215 |
| 2,346,955 | 4/1944 | Wolfson et al. | 156—89 |
| 2,538,959 | 1/1951 | Ballard | 25—156 |
| 2,618,579 | 11/1952 | Brajer | 156—89 |
| 3,110,619 | 11/1963 | Koenig et al. | 117—215 |

OTHER REFERENCES

Brewer et al., Abstract of Serial No. 791,466, published December 26, 1950, volume 641 O.G., p. 1346.

EARL M. BERGERT, *Primary Examiner.*